United States Patent [19]

Doyle et al.

[11] 4,394,545

[45] Jul. 19, 1983

[54] CONSTRUCTION OF A TELEPHONE INSTRUMENT

[75] Inventors: Francis S. Doyle, Oaklandon; Terry B. Prince; Martin J. Stevenson, both of Indianapolis, all of Ind.

[73] Assignee: Bell Telephone Laboratories, Incorporated, Murray Hill, N.J.

[21] Appl. No.: 129,243

[22] Filed: Mar. 11, 1980

[51] Int. Cl.³ .............................................. H04M 1/02
[52] U.S. Cl. ................................ 179/179; 179/100 D
[58] Field of Search ............... 179/100 R, 100 D, 103, 179/146 R, 178, 179; 220/4 B, 315, 324; 455/347, 349

[56] References Cited

U.S. PATENT DOCUMENTS

| | | | |
|---|---|---|---|
| 3,393,278 | 7/1968 | Gerosa et al. | 179/100 R |
| 3,400,226 | 9/1968 | Frumreich et al. | 179/103 |
| 3,617,658 | 11/1971 | Gruger et al. | 179/179 |
| 3,657,487 | 4/1972 | Schwack et al. | 179/100 R |
| 3,898,394 | 8/1975 | Ward et al. | 179/178 |
| 3,913,774 | 10/1975 | Vajtay | 220/4 R |
| 4,032,727 | 6/1977 | Burns, Jr. | 179/178 |
| 4,146,292 | 3/1979 | Garrett | 339/176 M |
| 4,163,874 | 8/1979 | Lenaerts et al. | 179/100 R |
| 4,163,875 | 8/1979 | Cogan | 179/103 |
| 4,286,124 | 8/1981 | Guttmann | 179/179 |

FOREIGN PATENT DOCUMENTS

| | | | |
|---|---|---|---|
| 968894 | 6/1975 | Canada | 179/179 |
| 1146123 | 3/1963 | Fed. Rep. of Germany | 179/100 D |
| 2014960 | 1/1978 | Fed. Rep. of Germany | 179/178 |
| 1180080 | 2/1970 | United Kingdom | 179/179 |

*Primary Examiner*—A. D. Pellinen
*Assistant Examiner*—Randall P. Myers
*Attorney, Agent, or Firm*—H. L. Newman

[57] ABSTRACT

To reduce manufacturing costs of telephone instruments it is desirable to secure components to housing members and secure housing members to one another without the use of fasteners. In the past this has been accomplished by the use of flexible latch elements that are deflected from their normal position in the process of assembly, and then return to their normal position to perform their latch function when assembly is complete. The problem with this arrangement is that impact, such as occurs during shipping or when a telephone instrument is accidentally dropped, has been found to cause the flexible latch elements to deflect and release the housing members and/or components they are intended to secure.

The disclosed telephone instrument solves the problem of securing the components in place by having integral flexible latch elements (115) extend alongside of a wall (140) of one housing member (100) and integral blocking elements (245) included in the mating housing member (200). These elements are arranged so that when the two housing members are joined together, the blocking elements extend between the wall and the latch elements and prevent the latch elements from deflecting while the housing members are joined.

The disclosed telephone instrument solves the problem of securing the housing members together by interlocking one end and latching the other end of the housing members. The latching is achieved by having inflexible latch elements (135, 235) integral to each housing member move into interlocking engagement by means of flexing the adjacent wall (130) of one housing member (100).

13 Claims, 7 Drawing Figures

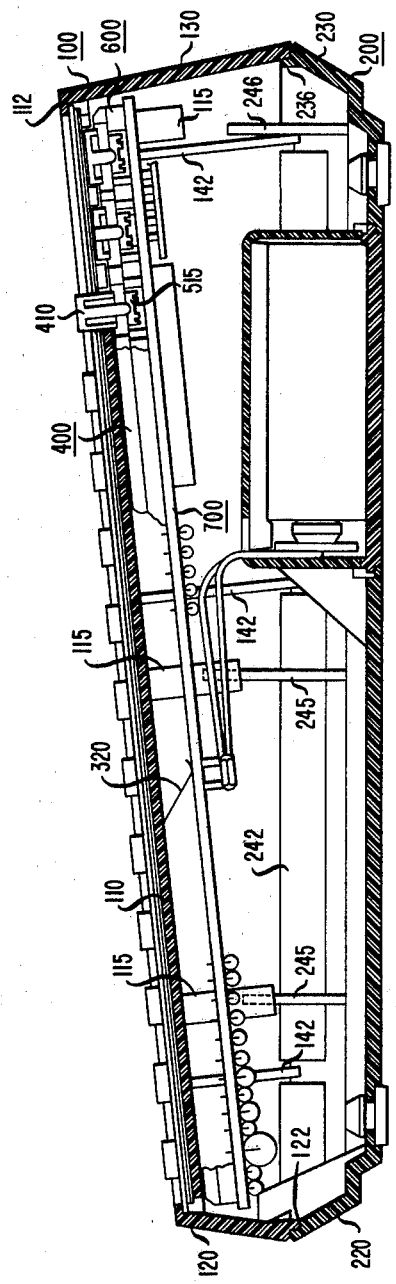

CONSTRUCTION OF A TELEPHONE INSTRUMENT

FIELD OF THE INVENTION

This invention relates to the construction of telephone instruments and within that field to a telephone instrument construction that permits the assembly of components and housing members without the use of fasteners.

BACKGROUND OF THE INVENTION

As labor costs rise, it becomes of increasing importance to reduce the time required to assemble a telephone instrument. One way of reducing assembly time is to eliminate the use of fasteners both to assemble components to a housing member and to assemble housing members together. As shown in Gruger et al U.S. Pat. Nos. 3,617,658 and Schwank et al 3,657,487 this may be accomplished by the use of flexible latch elements that are deflected from their normal position in the process of assembly and then return to their normal position to perform their latch function when assembly is complete.

The problem with this arrangement is that in order for a telephone instrument to quality under the registration rules of the Federal Communications Commission, it must withstand six random drops from 30 inches onto a concrete floor. This drop test is intended to simulate the shock a telephone instrument may encounter during loading, shipping, and unloading as it moves from the manufacturer to a distributor, from the distributor to a supplier, and from the supplier to the premises of a user. It has been found that the impact from such a drop can cause flexible latch elements to deflect and release the housing members and/or components that they are intended to secure. While the interest of the Federal Communications Commission is avoiding damage to the telephone instrument that will cause harm to the telephone network, from the manufacturer's standpoint it is undesirable to have the telephone instrument come apart even if no harm to the network results.

Another matter of concern with respect to the structural arrangement by which the housing members are joined together is that the arrangement not detract from the appearance of the instrument and that it be readily usable by a serviceperson yet concealed so as not to encourage disassembly by the user. The latter is especially important where the telephone instrument is provided to the user on a lease basis rather than being sold.

SUMMARY OF THE INVENTION

A telephone instrument constructed in accordance with the present invention provides a solution to these problems. The problem of securing the components in place is solved by one housing member having integral flexible latch elements and the other housing member having integral blocking elements. These elements are arranged so that when the two housing members are joined, each blocking element extends in between an associated latch element and a wall of the one housing member. The wall is spaced from the latch element in the direction in which the latch element is deflected. Even if the blocking element itself has little strength, this arrangement enables the blocking element to prevent the latch element from being deflected as long as the two housing members are joined. In addition the wall prevents the latch element from being deflected to a point where it is overstressed.

The problem of securing the two housing members together is solved by interlocking, such as by hinging, one end of the housing members and latching in a particular way the opposing end of the housing members. The latching is achieved by one housing member having an inflexible securing element that extends adjacent to a wall of the housing member and a cooperating inflexible securing element being integral to an adjoining wall of the second housing member. The securing elements move into interlocking engagement with one another by means of the wall of the second housing member being flexed from its normal position during the assembly of the housing members and returning to its normal position once assembly is complete to latch the housing members together. This arrangement, in addition to providing a latch with sufficient stiffness to withstand shock to the telephone instrument, permits the securing elements to be essentially concealed from view.

BRIEF DESCRIPTION OF THE DRAWING

FIG. 2 is a longitudinal sectional view of the assembled telephone instrument;

FIGS. 3 and 4 are longitudinal sectional views showing in combination with FIG. 2 the manner in which the front end of the housing members of the telephone instrument are joined together;

FIG. 5 is a longitudinal sectional view showing in combination with FIG. 2 the manner in which the rear end of the housing members are joined together;

FIG. 6 is a transverse sectional view of the assembled telephone instrument.

DETAILED DESCRIPTION

Figure 1:
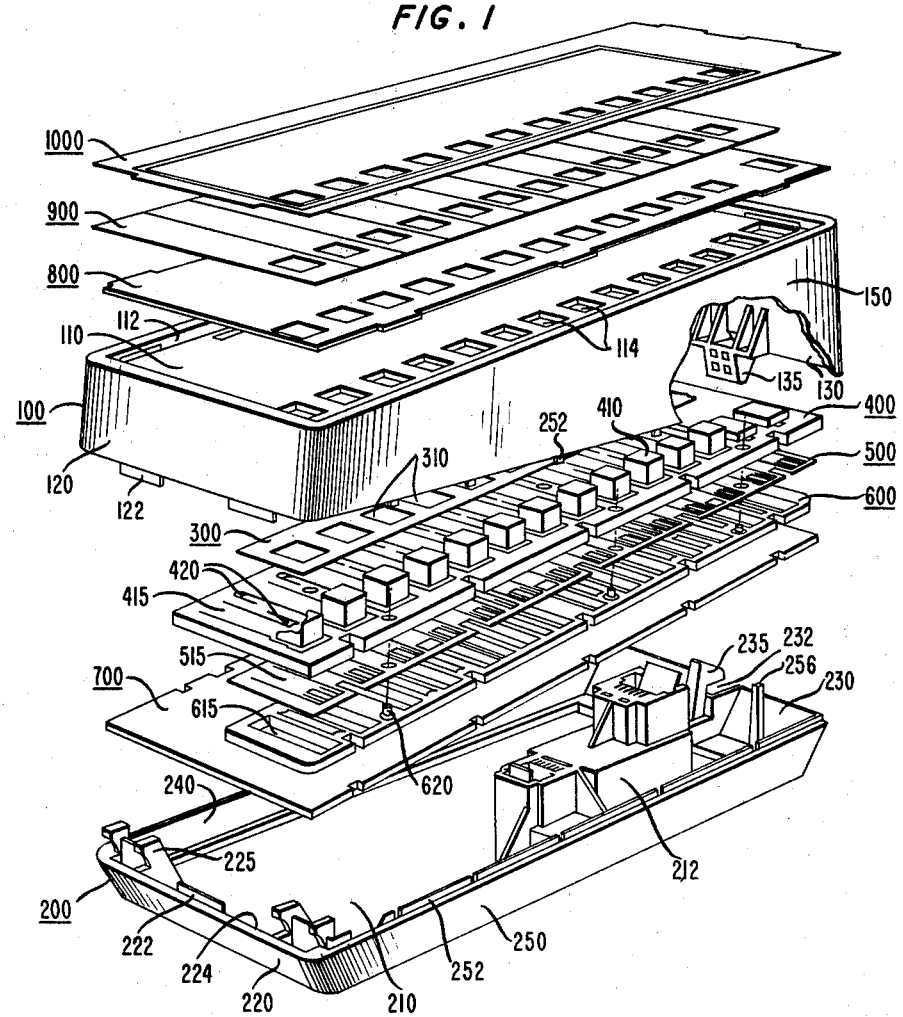
FIG. 1 is an exploded perspective view of a telephone instrument in accordance with the present invention.

Referring to FIG. 1 of the drawing, there is shown an exploded perspective view of a repertory dialer adjunct adapted to be positioned adjacent to and connected in series with a telephone set. The adjunct comprises a molded upper housing member 100 and a molded lower housing member 200 that when joined together enclose the components of the adjunct. These components include a keyboard assembly consisting of a static shield 300, a button frame 400, a contact spring web 500, and a spacer 600. Also included is a circuit board 700 on which the electrical components, including a microprocessor and a random access memory (not shown), are mounted. All of the foregoing components are secured to the upper housing member 100 without the use of fasteners.

The button frame 400 is a unitary dielectric molded member that includes a column of fourteen pushbutton member 410, each of which is located at the end of a flexible cantilever beam 415. Situated between each beam 415 is a pair of cantilever spring fingers 420. The spring fingers 420 extend in opposite directions from one another and each has a raised boss at its free end.

The contact spring web 500 is a unitary conductive strip having fourteen cantilever spring arms 515, each of which has two spaced pairs of bifurcated contacts at its free end. Finally, the spacer 600 comprises a unitary molded dielectric member having fourteen openings 615. The spacing of the spring arms 515 and the openings 615 correspond to that of the beams 415 of the button frame 400 and the openings are of a size to accommodate the spring arms.

The button frame 400, contact spring web 500, and spacer 600 are assembled in the proper location with respect to one another by means of three upstanding pins 620 of the spacer. First the contact spring web 500 and then the button frame 400 are positioned with the pins 620 extending through three correspondingly spaced holes therein. The components are then secured together by three depending latch elements 430 of the button frame 400, one of the latch elements being shown in FIG. 6. The latch elements 430 extend through openings in the web 500 and engage lips on the spacer 600 to hold the three components together.

The static shield 300 is a conductive strip having fourteen holes 310 corresponding in size and spacing to the pushbuttons 410 of the button frame 400, and thus the static shield is assembled in place by being positioned on the button frame with the pushbuttons extending through the holes. The static shield 300 includes an arm (not shown) that extends laterally beyond the side of the button frame 400 opposite to the pushbuttons 410. The arm terminates in a spring factor 320, shown in FIG. 2, that is adapted to engage a ground path on the circuit board 700. The static shield 300 thereby protects the electrical components on the circuit board from being damaged by static discharge from the finger of a user when depressing a pushbutton 410.

The keyboard assembly is secured to the upper housing member 100 by the circuit board 700. The upper housing member 100 comprises a face 110 from which depend front and rear walls 120 and 130 and left and right sidewalls 140 and 150. The face 110 has a ridge 112 circumscribing its perimeter and a column of holes 114 extending along its right side, the holes being of a size and spacing to accommodate the pushbuttons 410 of the button frame 400.

As shown in FIGS. 2 and 6, the face 110 additionally has three integral flexible cantilever latch elements 115 extending downwardly from its interior surface. The latch elements 115 extend adjacent to and are spaced along the length of the sidewall 140. In addition, as seen most clearly in FIG. 6, the free end of each latch element 115 is inverted nose shaped in that it has a ramp surface inclined to its length above which is a catch surface perpendicular to its length. The catch surfaces of the latch elements 115 are spaced equidistant from the interior surface of the face 110, which distance is essentially the thickness of the circuit board 700 and the keyboard assembly excluding the pushbuttons 410.

The face 110 also has a number of spaced integral ribs 116, one of which is shown in FIG. 6, extending downwardly from its interior surface. The ribs 116, which extend for a short distance transverse to the sidewalls 140 and 150, have a height that is essentially the same as the thickness of the keyboard assembly excluding the pushbuttons 410. Finally, the face 110 has a number of spaced integral locating pins 118, one of which is shown in FIG. 6, extending downwardly from its interior surface. The height of the pins 118 is slightly less than that of the ribs 116.

As shown in FIG. 2, integral to the sidewall 140 are three posts 142 that extend an equal distance below the rim of the wall and extend inwardly from the inner surface of the wall. Similarly, integral to the inside surface of the sidewall 150 are five posts 152, one of which is shown in profile in FIG. 6. The posts 152 extend an equal distance below the rim of the sidewall 150 and extend inwardly from the interior surface of the wall. Each post 152 includes a ledge 154 having a ramp surface inclined to the length of the posts and a catch surface perpendicular to the length of the post. The catch surfaces of the ledges 154 are spaced essentially the same distance from the interior surface of the face 110 as the catch surfaces of the latch elements 115.

Referring to FIGS. 1 and 6, in assembling the components the keyboard assembly is first positioned on the interior surface of the face 110 with the pushbuttons 410 of the button frame 400 extending through the holes 114 and with the locating pins 118 of the face extending through correspondingly located openings in the button frame, contact spring web 500, and spacer 600. It is seen in FIG. 1 that these last three components have notches formed in one side that are spaced to correspond to the posts 152 on the interior surface of the sidewall 150, and the notches accommodate the upper ends of these posts to further locate the keyboard assembly.

The assembly is completed by first inserting the circuit board 700 into engagement with the portion of the posts 152 between the keyboard assembly and the catch surfaces of the ledges 154. It is seen from FIG. 1 that the right side of the circuit board 700 also has notches for accommodating the posts 152, and it is seen from FIG. 6 that the underside of the spacer 500 is beveled along its right edge to permit the left side of the circuit board to be tilted downward as the circuit board is inserted into engagement with the posts. In somewhat similar fashion, the left side of the circuit board 700 has notches, shown in FIG. 1, that accommodate the posts 142 on the interior surface of the sidewall 140 and that engage the latch elements 115.

Thus when the left side of the circuit board 700 is raised, the inclined ramp surfaces of the latch elements 115 are engaged and the elements deflected toward the sidewall 140. Then when the left side of the circuit board 700 is moved into engagement with the ribs 116 on the interior of the face 110, the latch elements 115 return to their normal position. The catch surfaces of the latch elements 115 then underlie the left side of the circuit board 700 and the catch surfaces of the ledges 154 underlie the right side of the board, whereby the board and the keyboard assembly are secured in place. The spring fingers 420 of the button frame 400 press upwardly against both the interior surface of the face 110 and the static shield 300 and thereby serve to take up tolerance variations between components so as to provide a snug, rattle-free assembly.

Referring to FIG. 1, the ridge 112 surrounding the exterior of the face 110 has slots formed on the interior of its sides and its front and back. These slots serve to secure an instruction label 800, directory sheet 900, and face plate 1000 to the face 110. The instruction label 800 is a flexible sheet having tabs along its sides corresponding in size and location to the slots in the sides of the ridge 112 and having holes along one side corresponding in size and spacing to the holes 114 in the face 110. The label 800 is sized so that by bowing it along its length, the tabs can be aligned with the associated slots and then moved into the slots when the label returns to its normal planar shape. The directory sheet 900 has holes corresponding in size and spacing to the holes in the instruction label 800 and is positioned with these holes in registration. The directory sheet 900 is held in place by the ridge 112 and by the face plate 1000. The latter is a flexible transparent sheet having tabs at each end corresponding in size and spacing to the slots in the front and back of the ridge 112 and having holes along one side corresponding in size and spacing to the holes in the directory sheet 900. The face plate 1000 is sized so that by bowing it transverse to its length the tabs can be aligned with the associated slots and then moved into the slots when the face plate returns to its normal planar shape.

Turning now to FIGS. 1-5, the front and rear walls 120 and 130 of the upper housing member 100 include the means by which the upper housing member 100 and lower housing member 200 are joined together. The interior of the front wall 120 includes a pair of spaced tabs 122, shown in FIGS. 1 and 2, that extend below the rim of the wall. The interior of the front wall 120 also includes a recess 124, shown in FIG. 3, that extends upwardly from the rim between the tabs 122. Furthermore, the interior of the front wall 120 includes an arcuate flange 125, shown in FIG. 4, between each tab 122 and the adjacent sidewall of the upper housing member 100.

The rear wall 130 of the upper housing member 100 includes an inflexible securing element 135, shown in FIG. 1, that extends inwardly from the interior surface at the rim of the wall and downwardly from the rim. The securing element 135 has an inclined ramp surface leading to a horizontal catch surface.

These elements of the front and rear walls 120 and 130 cooperate with elements of front and rear walls 220 and 230 of the lower housing member 200. The interior of the front wall 220 includes a tab 222, shown in FIGS. 1 and 3, that extends above the rim of the wall, and a recess 224, shown in FIG. 1, on either side of the tab that extends downwardly from the rim. Also extending upwardly from the interior of the front wall 220 are pairs of stanchions 225. The stanchions 225 extend above the rim of the front wall 220 and have arcuate front surfaces that conform to the arcuate flanges 125 of the upper housing member 100.

The rear wall 230 of the lower housing member 200 includes a recess 232 within which is positioned an inflexible securing element 235. The securing element 235 extends above the rim of the rear wall 230 and includes an inclined ramp surface and a horizontal latch surface. In addition the interior of the rear wall 230 has a flange 236, shown in FIG. 2, that is located on each side of the recess 232 and extends above the rim of the wall.

Sidewalls 240 and 250 of the lower housing member 200 also have elements that interact with the upper housing member 100. The interior of the sidewall 240 has a flange 242, shown in FIG. 6, that extends above the rim of the wall, and as shown in FIG. 2, there are spaced interruptions in the flange that correspond to the spacing of the posts 142 of the upper sidewall 140. In addition the sidewall 240 has two integral blocking posts 245, one of which is shown in profile in FIG. 6, that extend above the rim of the wall and inwardly from the interior surface of the wall. As shown in FIG. 2, the spacing of the posts 245 corresponds to the spacing of the forward two latch elements 115 and the posts are of a height to interact with the latch elements. The sidewall 240 also has an integral stop post 246 adjoining the interruption in the flange 242 closest to the rear wall 230.

In somewhat similar fashion the interior of the sidewall 250 has a flange 252, shown in FIGS. 1 and 6, that extends above the rim of the wall. As seen from FIG. 1, the flange 252 has spaced interruptions that correspond to the spacing of the posts 152 of the upper sidewall 150. In addition the sidewall 250 has an integral stop post 256 adjoining the interruption in the flange 252 closest to the rear wall 230.

The upper and lower housing members 100 and 200 are joined together by tilting the back ends of the housing members away from one another and moving the front wall 120 toward the front wall 220 so as to position the tabs 122 in initial engagement with the recesses 224, the tab 222 in initial engagement with the recess 124, and the arcuate flanges 125 in initial engagement with the conforming surfaces of the stanchions 225. In addition to placing the rims of the front walls 120 and 220 in proper alignment, this engagement aligns the sidewalls 140 and 240 and the sidewalls 150 and 250 with one another. Furthermore as the rear walls 130 and 230 are moved toward one another, the interlocking between the cooperating elements of the front walls 120 and 220 increases. In addition, first the upper ends of the blocking posts 245 and then the upper ends of the stop posts 246 and 256 of the lower housing member 200 move inside the sidewalls 140 and 150 of the upper housing member 100. This combined interaction serves to guide the securing elements 135 and 235 into engagement with one another.

Once that engagement occurs, the interaction of the ramp surface of the securing elements 135 and 235 deflects the rear wall 130 rearwardly. Then as the rims of the rear walls engage, the ramp surfaces clear one another and the rear wall 130 returns to its normal position, moving the securing element 135 into the recess 232 and moving its catch surface beneath the catch surface of the securing element 235. The two housing members are thereby latched together, and because the securing element 135 of the upper housing member 100 moves into recess 232 in the lower housing member 200, the latching arrangement is relatively concealed. Advantageously the exterior surface of the securing element 135 is shaped to conform to the shape of the exterior surface of the rear wall 230 on either side of the recess to enhance this result. Furthermore it is seen that the arrangement does not detract from the appearance of the telephone instrument, there being no utility openings in the upper housing necessitated by the latching structure.

Although the latching arrangement is relatively concealed, it still allows for ready disassembly of the housing members 100 and 200 by a serviceperson. As seen most clearly in FIG. 1, the ramp surface of the securing element 135 is grid-like in construction. This provides the qualities of a solid surface yet avoids sink marks on the exterior surface of the securing element 135 that would result from the securing element being solid. As shown in FIG. 5, with the housing members 100, 200 joined, a tapered slot exists between the ramp surface of the securing element 135 and the rear wall of the recess 232. Thus the blade of a screwdriver can be inserted in this slot and used to deflect the securing element 135 and thereby the wall 130 rearwardly to disengage the securing elements 135 and 235. It is seen that since only interior surfaces are engaged by the screwdriver, the screwdriver does not scratch or mark any appearance surface of the housing.

It is to be noted that this joining of the upper and lower housing members 100 and 200 moves the rearward posts 142 and 152 of the upper housing adjacent to the stop posts 246 and 256 of the lower housing member. The separation between these respective pairs of posts is less than the overlap of the catch surfaces of the securing elements 135 and 235. Thus even should the housing be dropped on its front end, causing shock waves that act to move the rear portion of the lower housing member 200 forward relative to the rear portion of the upper housing member 100, the interaction between these posts prevents the securing elements from disengaging. Rearward movement of the rear portion of the lower housing member 200 relative to the rear portion of the upper housing member 100 is prevented by the securing elements 135 and 235 themselves and by the flanges 236 on the rear wall 230 of the lower housing member. Finally the stiffness of the rear wall 130 of the upper housing member 100 can be readily controlled to prevent the wall itself being sufficiently deflected as a result of any external impact to disengage the securing elements 135 and 235. Similarly the interlocking of the front walls 120 and 220 prevents any disengagement of the upper and lower housing members 100 and 200 as a result of an external impact on the housing.

As seen in FIGS. 2 and 6, the joining of the upper and lower housing members 100 and 200 moves the blocking posts 245 of the lower housing member between the forward two latches 115 and the sidewall 140 of the upper housing member. This prevents deflection of these latches 115, such as might be caused by the dropping of the housing on its side, as long as the housing members 100 and 200 are joined. Thus the components that are held in place by the flexible latches 115 cannot come free until the housing members 100 and 200 are separated. By having the latches 115 integral to the upper housing member 100 and the blocking post 245 integral to the lower housing member 200, there is an avoidance of build up of tolerance variations which can occur when discrete elements are assembled and which can defeat the proper interaction between the latches and blocking posts.

Referring to FIGS. 1, 2, and 6, the joining of the upper and lower housing members 100 and 200 also positions the flanges 242 and 252, which extend up from the interior of the rims of the lower sidewalls 240 and 250, adjacent to the respective interior surfaces of the upper sidewalls 140 and 150. Likewise the posts 142 and 252, which extend down from the interior of the rims of the upper sidewalls 140 and 150, are respectively positioned in the interruptions of the flanges 242 and 252 and adjacent to the interior surface of the lower sidewalls 240 and 250. This interaction corrects any mold warpage of the sidewalls and assures alignment of the upper and lower sidewalls within acceptable aesthetic limits.

Figure 7:
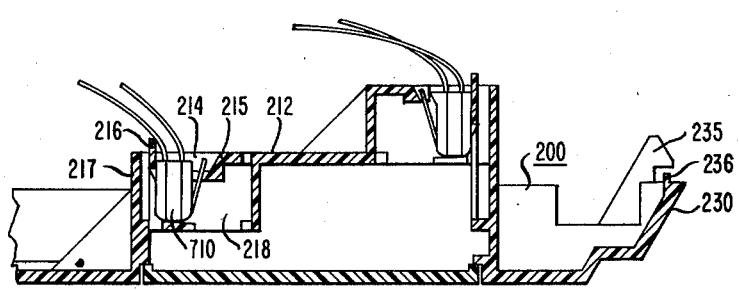
FIG. 7 is a longitudinal sectional view showing a jack structure of the lower housing member.

Turning now to FIGS. 1 and 7, the lower housing member 200 includes a base 210 having an integral jack portion 212 that provides a pair of modular jack connections to the telephone instrument. The jack structures are very similar to one another and therefore only one need be described. The jack structure comprises a cavity 214 configured to accommodate a contact spring carrier 710 of the type disclosed in U.S. Pat. No. 3,990,764, issued to C. L. Krumreich on Nov. 9, 1976. The carrier 710, which is connected to the circuit board 700, has a multiple of wire spring contacts extending along one side and a wedge-shaped boss on the opposite side. The boss has a ramp surface that is inclined to the length of the carrier and a catch surface perpendicular to the length of the carrier. One side of the cavity 214 includes a wall 215 having a multiple of slots for accommodating the wire spring contacts of the carrier, while the opposite side of the cavity has a cantilever latch element 216 having an opening for accommodating the boss of the carrier 710. The jack also includes an integral wall 217 that extends behind the latch element 216 in a spaced relationship and prevents the latch element from being deflected to the point of being overstressed.

As the carrier 710 is inserted into the cavity 214, the ramp surface of the boss deflects the latch element 216, and then when the carrier is fully inserted in the cavity, the latch element returns to its normal position. In this position the latch element 216 engages the catch surface of the boss and thereby secures the carrier 710 within the cavity 214. The cavity 214 communicates with a cavity 218 shaped to receive a mating modular plug.

It is to be understood that the embodiment described herein is merely illustrative of the principles of the invention. Various modifications may be made therein by persons skilled in the art without departing from the spirit and scope of the invention.

We claim:

1. A housing for a telephone instrument comprising first and second housing members that are joined together, the housing members having rims that are positioned adjacent to one another when the housing members are joined together, one portion of both the first and second housing members including cooperating elements for interlocking the first and second housing members together, and an opposing portion of both the first and second housing members including means for latching the first and second housing members together CHARACTERIZED IN THAT the means for latching the housing members together comprises an inflexible securing element included as part of the first housing member, the securing element being adjacent to a wall of and extending beyond the rim of the first housing member, and a cooperating inflexible securing element integral to and extending interiorly from a wall of the second housing member that is adjacent to the wall of the first housing member when the housing members are joined together, the wall of the second housing member being flexed from its normal position during the assembly of the housing members and returning to its normal position once assembly is complete to latch the housing members together, wherein the interlocking elements and the latching means alone join the housing members together.

2. A housing as in claim 1 wherein the securing element of the second housing member extends beyond the rim of the second housing member.

3. A housing for a telephone instrument comprising first and second housing members that are joined together, one portion of both the first and second housing members including cooperating elements for interlocking the first and second housing members together and an opposing portion of both the first and second housing members including means for latching the first and second housing members together CHARACTERIZED IN THAT the means for latching the housing members together comprises an inflexible securing element included as part of the first housing member, the securing element being adjacent to a wall of the first housing member having a recess, and a cooperating inflexible securing element included in a wall of the second housing member moves into the recess when the housing members are joined, the wall of the second housing member being flexed from its normal position during the assembly of the housing members and returning to its normal position once assembly is complete to latch the housing members together, and the exterior surface of the securing element of the second housing member conforming to the exterior surface configuration of the first housing member on each side of the recess, wherein the interlocking elements and the latching means alone join the housing members together.

4. A housing as in claim 3 wherein the first and second housing members are lower and upper housing members respectively, the lower housing member including the recess, and the wall of the upper housing member that includes the securing element being free of any utility openings.

5. A housing for a telephone instrument comprising first and second housing members that are joined together, one portion of both the first and second housing members including cooperating elements for interlocking the first and second housing members together and an opposing portion of both the first and second housing members including means for latching the first and second housing members together CHARACTERIZED IN THAT the means for latching the housing members together comprises an inflexible securing element included as part of the first housing member, the securing element being adjacent to a wall of the first housing member, and a cooperating inflexible securing element included in a wall of the second housing member that is adjacent to the wall of the first housing member when the housing members are joined together, the securing elements being nose shaped and inverted with respect to one another, and the securing elements both having ramp surfaces that interact with one another to deflect the wall of the second housing member during assembly and both having catch surfaces that overlap one another when assembly is complete to latch the housing members together, the wall of the second housing member being flexed from its normal position during the assembly of the housing members and returning to its normal position once assembly is complete, wherein the interlocking elements and the latching means alone join the housing members together.

6. A housing as in claim 5 wherein the housing members include stop elements that are positioned adjacent to one another when the housing members are joined together, the stop elements being in the vicinity of the securing elements, and the stop elements limiting movement of the portion of the first housing member adjacent to the securing elements relative to the portion of the second housing member adjacent to the securing elements in a direction to disengage the securing elements.

7. A housing as in claim 6 wherein the spacing between the stop elements is less than the overlap of the catch surfaces of the securing elements.

8. A housing for a telephone instrument comprising first and second housing members that are joined together, one portion of both the first and second housing members including cooperating elements for interlocking the first and second housing members together and an opposing portion of both the first and second housing members including means for latching the first and second housing members together CHARACTERIZED IN THAT the means for latching the housing members together comprises an inflexible securing element included as part of the first housing member, the securing element being adjacent to a wall of the first housing member, and a cooperating inflexible securing element included in a wall of the second housing member that is adjacent to the wall of the first housing member when the housing members are joined together, the wall of the second housing member being flexed from its normal position during the assembly of the housing members and returning to its normal position once assembly is complete to latch the housing members together, the housing members including stop elements that are positioned adjacent to one another when the housing member are joined together, the stop elements being in the vicinity of the securing elements, and the stop elements limiting movement of the portion of the first housing member adjacent to the securing elements relative to the portion of the second housing member adjacent to the securing elements in a direction to disengage the securing elements.

9. A housing as in claim 8 wherein the housing members have rims that are positioned adjacent to one another when the housing members are joined together, and the stop element of one housing member comprises a post that extends beyond the rim of that housing member.

10. A housing as in claim 9 wherein the stop element of each housing member comprises a pair of posts that adjoin opposite walls of the housing member.

11. A telephone instrument comprising a first and a second member that when joined together house the components of the telephone instrument;
a first of the housing members having means for mounting of a component thereto, the mounting means including a flexible latch element that is deflected from its normal position during the insertion of the component into place and that returns to its normal position once the component is in place to secure the component in its place, the latch element extending in close proximity to an adjacent portion of the first housing member and being deflected toward the member during insertion of the component; and
the second of the housing members having a blocking element that is positioned in between the latch element and the portion of the first housing member as the first and second housing members are joined together and prevents the latch element from being deflected while the first and second housing members are joined.

12. A telephone instrument as in claim 11 wherein the blocking element is integral to the second housing member.

13. A telephone instrument comprising:
a first and a second member that when joined together house the components of the telephone instrument;
a first of the housing members having means for mounting of a component thereto, the mounting means including a flexible latch portion and a portion integral to the flexible latch portion that is spaced from and extends alongside of the latch portion, the latch portion being deflected toward the integral portion during insertion of the component into place and returning to its normal position once the component is in place to secure the component in its place; and
the second of the housing members having an integral blocking element that is positioned in between the latch and integral portions of the mounting means as the first and second housing members are joined together and prevents the latch portion from being deflected while the first and second housing members are joined.

* * * * *

UNITED STATES PATENT AND TRADEMARK OFFICE
CERTIFICATE OF CORRECTION

PATENT NO. : 4,394,545

DATED : July 19, 1983

INVENTOR(S) : Francis S. Doyle et al

It is certified that error appears in the above-identified patent and that said Letters Patent is hereby corrected as shown below:

Column 3, line 24, "factor" should read -- finger --.

Column 10, line 8, "member" should read -- members --.

Signed and Sealed this

Twenty-eighth Day of February 1984

[SEAL]

Attest:

GERALD J. MOSSINGHOFF

Attesting Officer

Commissioner of Patents and Trademarks